(12) United States Patent
Tsuiki et al.

(10) Patent No.: US 7,080,712 B2
(45) Date of Patent: Jul. 25, 2006

(54) SOUNDPROOF MATERIAL FOR VEHICLE AND METHOD OF MANUFACTURING THE MATERIAL

(75) Inventors: Tomohiro Tsuiki, Kanagawa (JP); Fumiaki Takebayashi, Kanagawa (JP); Shozo Yabushita, Kanagawa (JP); Kuniaki Sasaki, Kanagawa (JP); Yuji Sakata, Kanagawa (JP); Kenji Furuta, Kanagawa (JP)

(73) Assignee: Kasai Kogyo Co., Ltd., Kanagawa (JP)

( * ) Notice: Subject to any disclaimer, the term of this patent is extended or adjusted under 35 U.S.C. 154(b) by 34 days.

(21) Appl. No.: 10/464,665

(22) PCT Filed: Jan. 22, 2002

(86) PCT No.: PCT/JP02/00403

§ 371 (c)(1),
(2), (4) Date: Jul. 11, 2003

(87) PCT Pub. No.: WO02/059870

PCT Pub. Date: Aug. 1, 2002

(65) Prior Publication Data

US 2004/0055813 A1 Mar. 25, 2004

(30) Foreign Application Priority Data

Jan. 23, 2001 (JP) ............................. 2001-014434
Sep. 10, 2001 (JP) ............................. 2001-274095
Oct. 19, 2001 (JP) ............................. 2001-322451
Jan. 18, 2002 (JP) ............................. 2002-010734

(51) Int. Cl.
*F02B 77/13* (2006.01)
*F02B 77/11* (2006.01)
*B60R 13/08* (2006.01)

(52) U.S. Cl. .................... 181/204; 181/210; 181/290; 296/39.3

(58) Field of Classification Search ................ 181/204, 181/205, 210, 290, 294, 286; 52/144, 145; 296/39.3; 428/328, 327, 340

See application file for complete search history.

(56) References Cited

U.S. PATENT DOCUMENTS 2,116,771 A * 5/1938 Seaman ..................... 181/290

(Continued)

FOREIGN PATENT DOCUMENTS

EP 0909680 A1 * 4/1999

(Continued)

*Primary Examiner*—Edgardo San Martin
(74) *Attorney, Agent, or Firm*—Dickstein Shapiro Morin & Oshinsky LLP

(57) ABSTRACT

An insulator dash (20) installed on the interior side surface side of a dash panel (10), comprising a single sound absorbing layer (21) formed of a fiber assembly or a laminated assembly having light and soft skin layers (22,23,26,27,28) laminated on the surface of sound absorbing layer (21), wherein, since the reflected noise reflected from the inner surface of an instrument panel (40) is taken again from the front surface side into the sound absorbing layer (21) for sound absorption in addition to the sound absorbing and shielding performance of the insulator dash (20), the sound absorbing performance in the instrument panel (40) can be increased, whereby the weight can be reduced and a rise of sound pressure in the instrument panel (40) can be abolishing a conventional sound shielding layer so as to increase a silentness in a cabin.

16 Claims, 14 Drawing Sheets

U.S. PATENT DOCUMENTS

| | | | | |
|---|---|---|---|---|
| 2,192,516 A | * | 3/1940 | Cunnington | 181/290 |
| 4,539,252 A | * | 9/1985 | Franz | 181/294 |
| 4,615,411 A | * | 10/1986 | Breitscheidel et al. | 181/224 |
| 4,655,496 A | * | 4/1987 | Gahlau et al. | 181/286 |
| 5,068,001 A | * | 11/1991 | Haussling | 181/290 |
| 5,258,585 A | * | 11/1993 | Juriga | 181/290 |
| 5,472,746 A | * | 12/1995 | Miyajima et al. | 427/468 |
| 5,633,067 A | * | 5/1997 | Illbruck et al. | 181/290 |
| 5,665,943 A | * | 9/1997 | D'Antonio | 181/294 |
| 5,817,408 A | * | 10/1998 | Orimo et al. | 181/294 |
| 5,925,207 A | * | 7/1999 | Itoh et al. | 156/216 |
| 6,524,691 B1 | * | 2/2003 | Sugawara et al. | 181/290 |
| 6,631,785 B1 | * | 10/2003 | Khambete et al. | 181/290 |
| 6,685,863 B1 | * | 2/2004 | Yabushita et al. | 264/254 |

FOREIGN PATENT DOCUMENTS

| | | | | |
|---|---|---|---|---|
| JP | 58174042 A | * | 10/1983 |
| JP | 59006150 A | * | 1/1984 |
| JP | 61018538 A | * | 1/1986 |
| JP | 2-181133 | | 1/1990 |
| JP | 04031185 A | * | 2/1992 |
| JP | 4-262973 | | 9/1992 |
| JP | 6-903 | | 1/1994 |
| JP | 7-199956 | | 8/1995 |
| JP | 10058975 A | * | 3/1998 |
| JP | 11-156976 | | 6/1999 |
| JP | 2000-347670 | | 12/2000 |
| JP | 2001233249 A | * | 8/2001 |

* cited by examiner

| | (2) Total of (b),(c) and (d) | (a) |
|---|---|---|
| —·— | (3) Sound shielding of instrumental panel | (b) |
| —··— | (4) Sound absorbing/shielding of insulator | (c) |
| ········ | (5) Sound absorbing of inside of inst. panel | (d) |

◇ Gas-permeable model

1/3 Octave-band frequency (Hz)

| | | |
|---|---|---|
| ——— | (2) Total of (b),(c) and (d) | (a) |
| —·—·— | (3) Sound shielding of instrumental panel | (b) |
| —··—··— | (4) Sound absorbing/shielding of insulator | (c) |
| ········· | (5) Sound absorbing of inside of inst. panel | (d) |

| — | (2) Total of (b),(c) and (d) | (a) |
| — · — | (3) Sound shielding of instrumental panel | (b) |
| — ·· — ·· | (4) Sound absorbing/shielding of insulator | (c) |
| -------- | (5) Sound absorbing of inside of inst. panel | (d) |

SOUNDPROOF MATERIAL FOR VEHICLE AND METHOD OF MANUFACTURING THE MATERIAL

TECHNICAL FIELD

The present invention relates to a sound insulator which is installed at the interior side surface of a body panel and to a method for manufacturing the same, and particularly to a sound insulator for vehicle whose the weight can be reduced by abolishing a conventional sound shielding layer with a large weight, and whose the soundproofing performance is high, and to a method for manufacturing the same.

BACKGROUND ART

In general, an insulator dash 2 is installed at the interior side surface of a dash panel 1 which separates an engine room E and a cabin R from each other, as shown in FIG. 24. The insulator dash 2 comprises a sound shielding layer 3 made of a material with a high density, such as a recycled rubber sheet, a recycled polyvinylchloride sheet, or the like, and a sound absorbing layer 4 formed of a fiber assembly, which is provided at the back side of the sound shielding layer and is integrally laminated to the sound shielding layer, as shown in the enlarged view of FIG. 25. A floor carpet 5 is laid over the surface at the lower side of the insulator dash 2 in a lapping manner. Also, the upper portion of the insulator dash 2 is positioned inside an instrument panel 6.

The soundproofing mechanism of the conventional insulator dash 2 having a two-layer structure will be described with reference to FIG. 26. A part of noise f1 from an engine or the like and auxiliary equipment provided in the engine room E is shielded by the dash panel 1, and the remaining noise is transmitted through the dash panel 1 and propagates to the cabin side. Noise represented by f2 enters the insulator dash 2.

Then, a part of the noise f2 is absorbed by the sound absorbing layer 4, and is shielded by the sound shielding layer 3. However, a part thereof, represented by f3, enters the instrument panel 6.

Moreover, the transmission noise f3, which has entered the instrument panel 6, is reflected from the inner surface of the instrument panel 6. The reflected noise f4 is reflected from the sound shielding layer 3 again. As a result, the reflected noise f4 and f5 become echoes in the space formed by the instrument panel 6. These echoes significantly prevent a silentness in the cabin.

According to this conventional soundproofing (sound-shielding and sound absorption) mechanism, the ratio of the sound shielding and absorption by the insulator dash 2 to the sound absorption in the instrument panel 6 is about 9:1.

As described above, the conventional insulator dash 2 is composed of a two-layer laminate assembly which comprises the sound shielding layer 3 made of a high density material and the sound absorbing layer 4 made of a fiber assembly. In this case, in particular, the weight of the sound shielding layer 3 increases and this goes against the lightening of products in weight, and deteriorates the efficiency of the fuel consumption and decreases the efficiency of installing operation of the insulator dash 2.

Moreover, according to the soundproofing mechanism of the conventional insulator dash 2, the efficiency of the sound absorption of the instrument panel 6 is very low compared with the efficiency of the sound shielding and absorption of the insulator dash 2, which is mainly due to the double wall sound shielding function. Thus, for soundproofing, elimination of the transmission sound, which previously could not be attenuated in the instrument panel 6, has been a problem to be urgently solved.

The present invention has been devised in view of the foregoing, it is an object of the present invention to provide a sound insulator to be installed at the interior side surface of a body panel, wherein the soundproofing material is lightened by abolishing a sound shielding layer with a large weight and has an increased soundproofing property, and a method for manufacturing the same.

DISCLOSURE OF INVENTION

The present invention is directed to a sound insulator for vehicle, which is installed at the interior side surface of a body panel. The sound insulator for vehicle comprises a single sound absorbing layer mainly composed of a fibrous molding assembly or a laminated assembly in which a surface skin layer, which are light weight and soft, such as a foamed resin sheet, a fiber assembly, a film or the like, are integrally laminated to a surface of the sound absorbing layer mainly composed of a fibrous molding assembly. Thereby, a conventional sound-shielding layer having a large weight can be abolished, and the fuel consumption efficiency can be increased. In addition, the efficiency of installing operation of the sound insulator for vehicle in a body panel can be increased.

Moreover, in the case the sound insulator for vehicle according to the present invention comprises the single sound absorbing layer mainly composed of a fibrous molding assembly, the noise transmitted through the body panel to enter the sound absorbing layer, especially noise in the intermediate and high sound ranges can be effectively absorbed due to the porous sound absorption function. Moreover, reflected sounds, which are transmitted through the sound absorbing layer and reflected from the inner surface of the panel in a cabin, are effectively absorbed through the surface to the inside of the sound absorbing layer again. Thus, the sound pressure in the cabin can be effectively suppressed.

Moreover, according to the structure in which the surface skin layer consisting of a non-woven fabric sheet, a foam sheet, or a film and so on is laminated to the surface of the sound absorbing layer formed of a fibrous molding assembly, these surface skin layers have a film vibration absorption function. Accordingly, noise in the low and intermediate frequency ranges can be absorbed.

That is, in the case that the surface skin layer made of a soft material is used, film-vibration or resonance is caused in the surface skin layer itself. Thus, noise, which propagates from the inside of the sound absorbing material into the cabin, can be attenuated. Also, radiation sound radiated from the cabin side can be attenuated, due to the film vibration or resonance. Thus, reflected sounds in the low and intermediate frequency ranges can be reduced.

Moreover, in the case that the surface skin layer is formed of a fiber assembly, such as a non-woven fabric and a foamed resin sheet material or the like, which has air-permeability, a porous sound absorption function can be added by controlling the resistance to permeability in addition to the sound absorption function caused by the film vibration or resonance.

BRIEF DESCRIPTION OF THE DRAWINGS

1 is a cross-sectional view showing the state in which the insulator dash is installed to a dash panel. FIG. 2 illustrates the soundproofing mechanism of the insulator dash. FIG. 3 is a graph showing the soundproofing property of the insulator dash. FIG. 4 is a modification of the insulator dash.

FIG. 5 is a cross-sectional view showing the state in which the insulator dash is installed to a dash panel. FIG. 6 is a graph showing the soundproofing property of the insulator dash. FIG. 7 illustrates a modification of the insulator dash.

FIG. 8 is a cross-sectional view showing the state in which the insulator dash is installed to a dash panel. FIG. 9 is a cross-sectional view showing the essential part of the insulator dash. FIG. 10 illustrates a mold, which is used for forming the insulator dash.

FIG. 11 is a cross-sectional view showing the state in which the insulator dash is installed to a dash panel. FIG. 12 illustrates variations of the surface skin of the film used in the insulator dash. FIG. 13 is a graph showing the soundproofing property of the insulator dash. FIG. 14 and FIG. 15 is a modification of the insulator dash, respectively.

FIG. 16 is a cross-sectional view showing the state in which the insulator dash is installed to a dash panel. FIG. 17 is a schematic view showing a method for manufacturing the insulator dash. FIG. 18 is a cross-sectional view showing a modification of the insulator dash. FIG. 19 schematically shows a method for manufacturing the insulator dash.

Moreover, FIG. 20 is a cross-sectional view showing the state in which the insulator dash is installed to a dash panel. FIG. 21($a$) is a schematic view showing the structure of the insulator dash. FIG. 21($b$) illustrates the soundproofing mechanism of the insulator dash. FIG. 22($a$) is a schematic cross-sectional view showing a modification of the insulator dash. FIG. 22($b$) illustrates the soundproofing mechanism of the insulator dash. FIG. 23 is a schematic view of a modification of the insulator dash.

BEST MODE FOR CARRYING OUT THE INVENTION

First, the first embodiment of the present invention will be described with reference to FIGS. 1 to 4.

Figure 1:
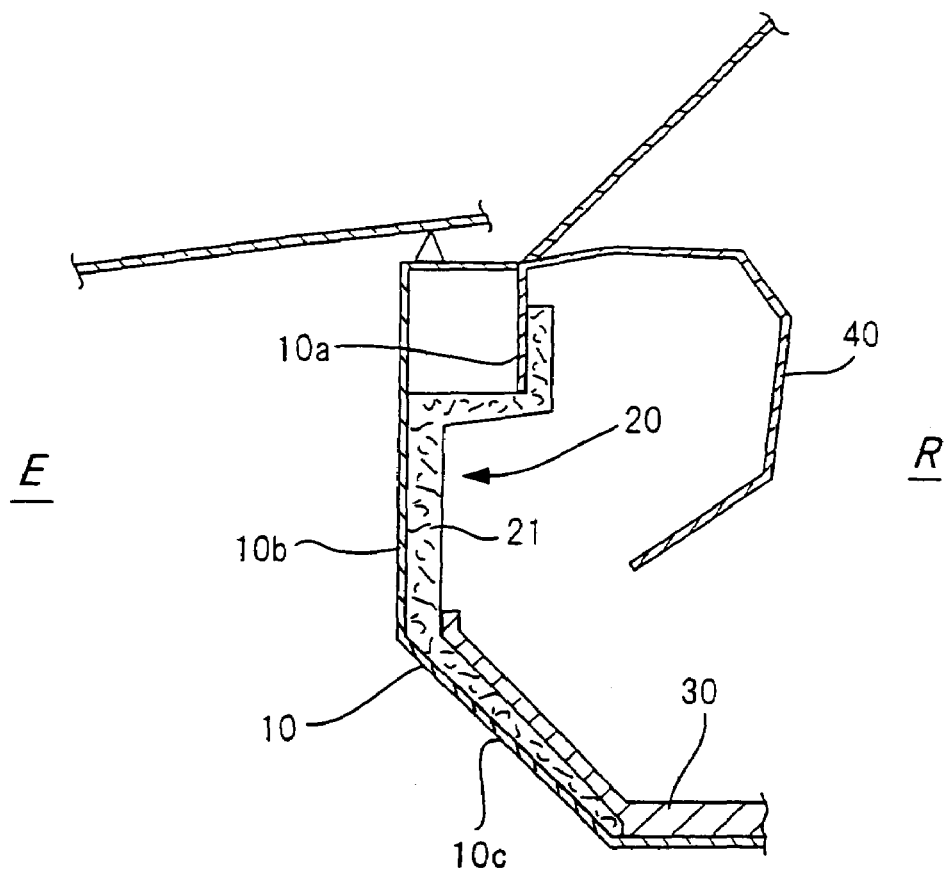
FIGS. 1 to 4 illustrate a first embodiment in which the present invention is applied to a vehicle insulator dash. FIG.

In FIG. 1, an engine room E and a cabin R is separated by a dash panel 10. The dash panel 10 is divided into a dash upper portion 10$a$, a dash lower portion 10$b$, and a toe board 10$c$. An insulator dash 20 is installed at the interior side surface of the dash panel 10. A floor carpet 30 is laid on the surface side of the insulator dash 20 installed on the toe board 10$c$ in a lapping manner. The upper half of the insulator dash 20 installed on the dash upper portion 10$a$ and an upper half of the dash lower portion 10$b$ of the dash panel 10 is positioned in an instrument panel 40. A crush pad, not shown in the drawing, is installed on the instrument panel 40.

For the purpose of increasing the efficiency of the fuel consumption and installing operation, the insulator dash 20 according to the present invention is formed in such a manner that the product weight is considerably reduced, and the product has a sufficient soundproofing property even though the weight is reduced.

In particular, the insulator dash 20 has a single layer structure comprising a sound absorbing layer 21 formed of a fiber assembly. Referring to materials for the sound absorbing layer 21, the sound absorbing layer 21 is formed of a fiber assembly made of felt, PET (polyester) fibers, or paper (pulp, etc.) and so on in the form of fibers. The sound absorbing layer 21 is formed using a thermoplastic or thermosetting resin as a binder so as to extend along the surface features of the dash panel 10. The thickness of the sound absorbing layer 21 is set to be in the range of 5 to 150 mm. The planar density is set to be 3.0 kg/m$^2$ or less. For the sound absorbing layer 21, a material having an average sound absorption ratio in the frequency range of 630 to 4000 Hz adjusted to 30 to 90% at a thickness of 20 mm is used.

According to this embodiment, PET resin having a low melting point is mixed as a binder with recycled PET fibers, stacked into a mat shape on a conveyor belt, heat-treated, press-formed into a desired mat shape by hot press forming. The resultant raw mat is heated to be softened and then is formed by means of a cold press mold having a desired mold-shape into a desired shape so as to extend along the surface features of the dash panel 10.

For the raw mat impregnated with a thermosetting resin as a binder, the mat is formed into a desired shape and size by using hot press forming.

According to the present invention, as described above, the binder may be a thermoplastic resin or a thermosetting resin. The material and the forming-process are not particularly limited, provided that the sound absorbing layer 21 is formed of a fiber assembly having superior sound absorbing properties.

As described above, the insulator dash 20 according to the present invention comprises the single sound absorbing layer 21. Therefore, a conventional sound shielding layer comprising a rubber sheet with a large weight or a polyvinylchloride sheet can be abolished. Thus, the product weight can be significantly reduced, and the efficiency of the fuel consumption can be enhanced, due to the reduction in weight. In addition, the efficiency for installing operation of the insulator dash 20 on the dash panel 10 is superior.

Figure 2:
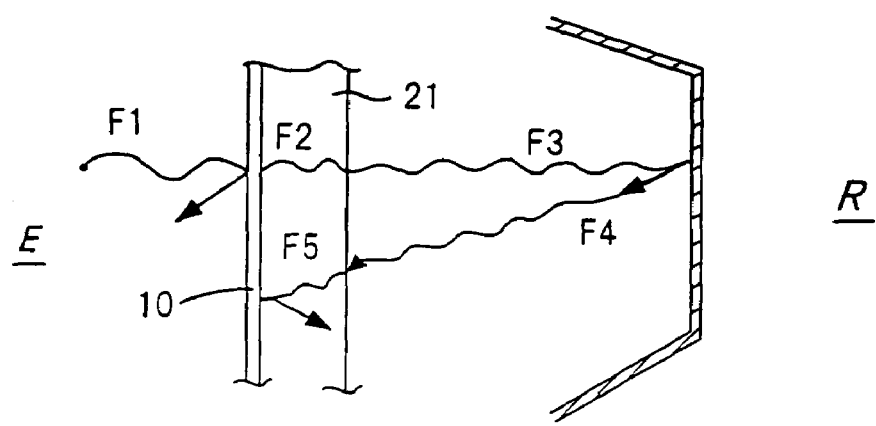

Moreover, since the insulator dash 20 according to the present invention comprises the single sound absorbing layer 21, the soundproofing mechanism illustrated in FIG. 2 is achieved.

In particular, for a noise generated in the engine room E (F1 in FIG. 2), a part of the noise is shielded by the dash panel 10, and the remaining noise (F2 in FIG. 2) enters the sound absorbing layer 21.

Then, a part of the noise represented by F2 is absorbed due to the sound absorbing function of the sound absorbing layer 21. As a result, the remaining transmission noise (F3 in FIG. 2) enters the instrument panel 40 and is reflected from the inner surface of the instrument panel 40. The reflected noise (F4 in FIG. 2) is transmitted to the sound absorbing layer 21, that is, the noise becomes a return-transmission noise (F5 in FIG. 2), and is absorbed due the sound absorbing function of the sound absorbing layer 21 again.

As described above, according to the adopted structure of the single sound absorbing layer 21, a part of the noise which propagates through the dash panel 10 into the cabin is absorbed, and the transmission noise transmitted through the sound absorbing layer 21 to the cabin is reflected from the instrument panel 40. The reflected noise is attenuated by the sound absorbing layer 21 again. Thereby, the transmission noise not attenuated in the instrument panel 40 can be effectively suppressed.

Figure 3:
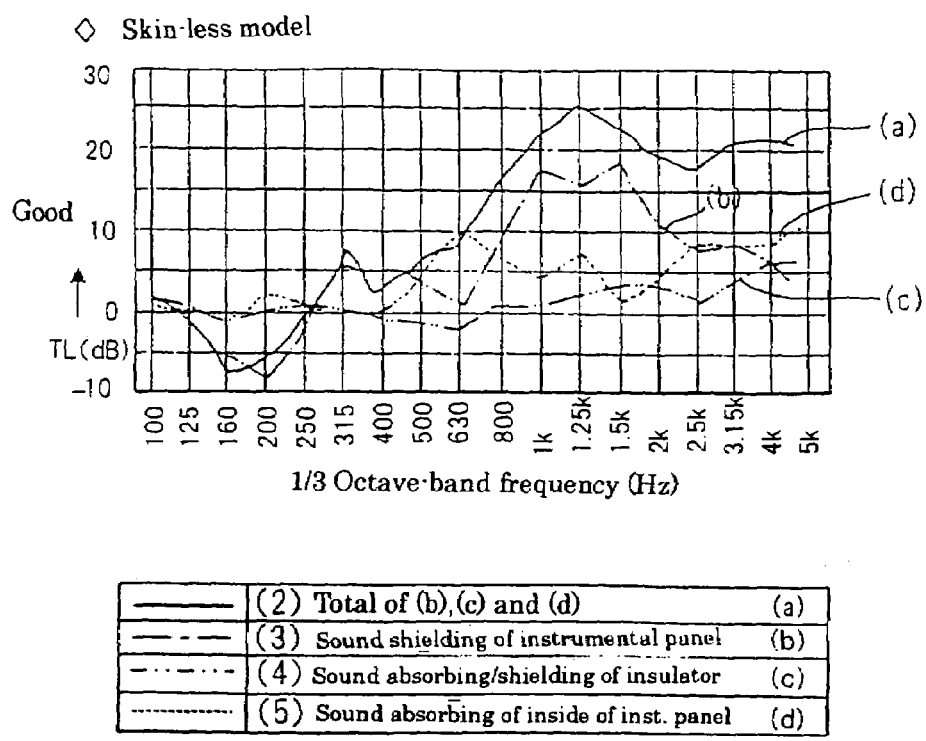

As seen in the graph of FIG. 3 showing the soundproofing property of the insulator dash 20, the soundproofing property (a) of the insulator dash 20 comprising the single layer of the sound absorbing layer 21 is equivalent to the total of the sound shielding property (b) of the instrument panel 40, the sound absorbing and shielding property (c) of the sound absorbing layer 21, and the sound absorbing property (d) of the space formed in the instrument panel 40. In particular, it can be clearly understood from the graph that noise at intermediate and high frequencies can be attenuated effectively.

Figure 4:
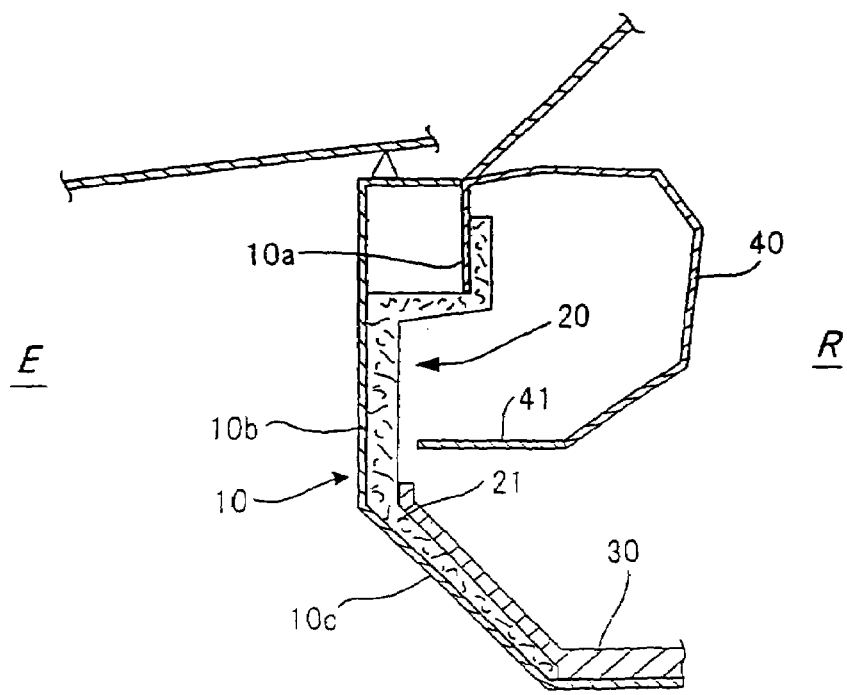

FIG. 4 is a modification of the insulator dash 20. Characteristically, to increase the sound absorbing property of space formed in the instrument panel 40, an instrument lower cover panel 41 is installed on the under side of the instrument panel 40 so that the inside of the instrument panel 40 forms a closed space. Thereby, the sound absorbing performance the inside of the instrument panel 40 can be further increased. Thus, further improvement of the soundproofing property can be expected.

Figure 5:
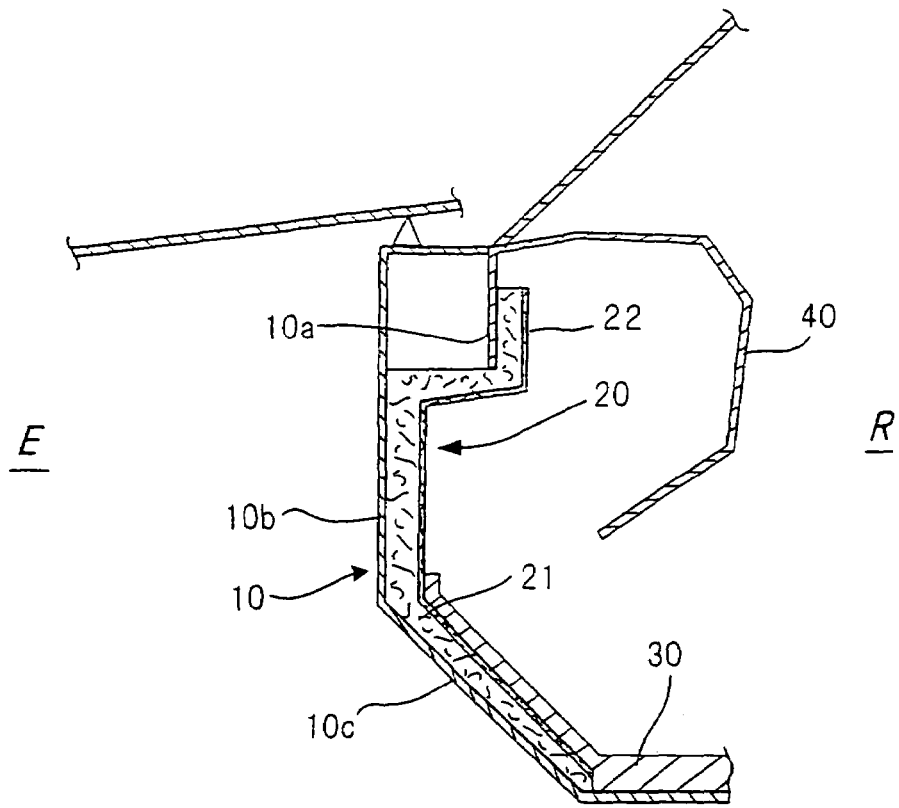
FIGS. 5 to 7 illustrate a second embodiment in which the present invention is applied to a vehicle insulator dash.
Figure 6:
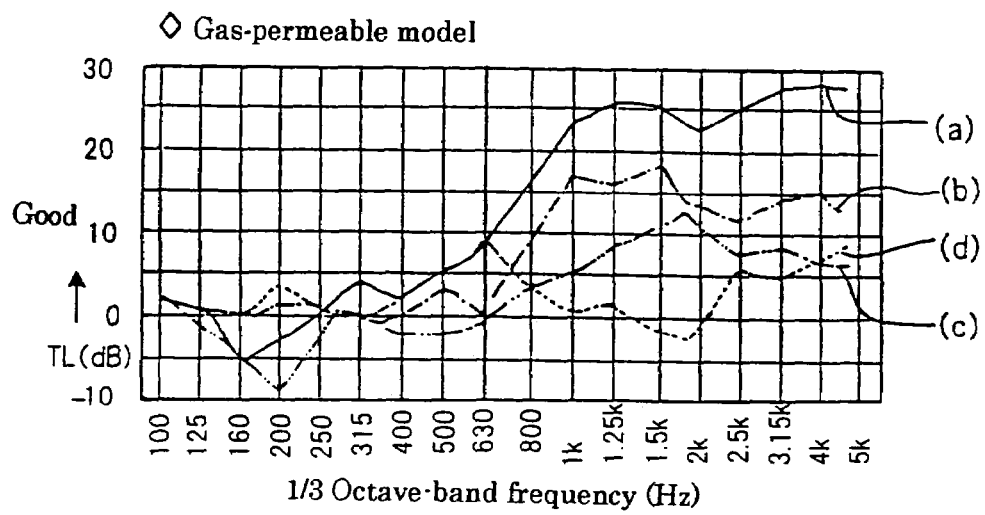
Figure 7:
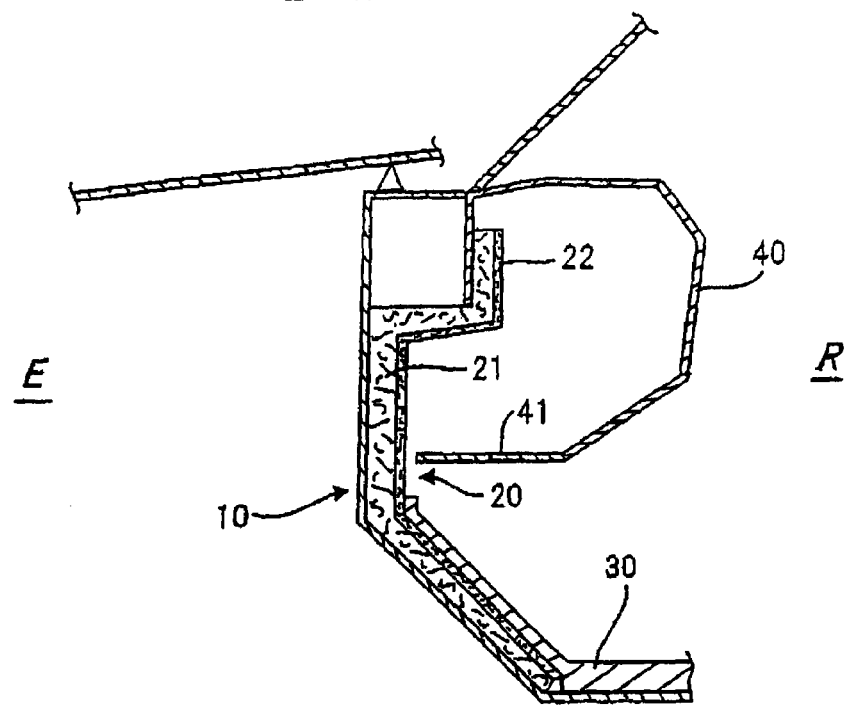

FIGS. 5 to 7 illustrate the second embodiment of the present invention. In the insulator dash 20 according to the second embodiment, a surface skin layer 22 formed of a fiber assembly is laminated the sound absorbing layer 21 on the surface side thereof.

The sound absorbing layer 21 having the same structure as that of the first embodiment may be used. Characteristically, the surface skin layer 22 is set so as to have a higher density than the sound absorbing layer 21.

Referring to materials for the surface skin layer 22, the layer 22 is formed of a fiber assembly which is made of felt, PET (polyester fiber) fibers or paper (pulp etc.) and so on in the form of fibers. The planar density of the fiber assembly is in the range of 0.005 to 0.3 kg/m$^2$. The surface skin layer 22 shields a part of the noise transmitted from the engine room E through the dash panel 10 into the sound absorbing layer 21, and also absorbs a part of the noise. The remaining noise transmitted through the surface skin layer 22, which is reflected from the inner surface of the instrument panel 40 and then is transmitted through the surface skin layer 22 again to enter the sound absorbing layer 21, is absorbed. Therefore, the transmission sound that is not attenuated inside the instrument panel 40 can be effectively suppressed to a low level.

Moreover, in this embodiment, the surface skin layer 22 is arranged on the surface side of the sound absorbing layer 21. However, the surface skin layer 22 may be integrally laminated the sound absorbing layer 21 on the dash panel 10 side, that is, on the back side thereof. Moreover, a part of the surface skin layer 22 may be laminated with a part of the sound absorbing layer 21, and the remaining part may be a single layer.

For the insulator dash 20 comprising the sound absorbing layer 21 and the surface skin layer 22, a material whose the average sound absorption ratio in the frequency range of 630 to 4000 Hz is adjusted to 15 to 95% at a thickness of 20 mm is used. The thickness of the surface skin layer 22 is set at 15 mm and the thickness of the insulator dash 20 is set to be in the range of 15 to 150 mm.

Moreover, referring to a forming process for the sound absorbing layer 21 and the surface skin layer 22, fibers may be sprayed on a conveyor so as to be stacked into a mat shape, thereby a raw mat being prepared as a absorbing layer. Then, hot melt powder may be adhered to a surface side of the absorbing layer 21 corresponding to the surface skin layer 22, which is formed into a mat shape in advance, and is heat-treated. Then the absorbing layer with hot melt being in the molten state is laminated to the surface skin layer 22 by cold press forming.

FIG. 6 is a graph showing the soundproofing property of the insulator dash 20 according to the second embodiment. It is seen that the soundproofing property (a) of the insulator dash 20 is equivalent to the total of the sound shielding property (b) of the instrument panel 40, the sound absorbing and shielding property (c) of the insulator dash 20, and the sound absorbing property (d) inside the instrument panel 40, and a superior soundproofing property in the range of 630 to 4000 Hz is obtained.

Referring to the composition of the insulator dash 20 used in this measurement, PET fibers with 2.0 kg/m$^2$ were used for the sound absorbing layer 21, and PET fibers with 1.2 kg/m$^2$ were used for the surface skin layer 22.

As described above, according to the second embodiment, a conventional sound shielding layer having a large weight can be abolished. Therefore, the insulator dash 20 is advantageous in that the weight can be reduced, the efficiency of the fuel consumption is enhanced, and the efficiency for installing operation becomes as good as the first embodiment. In addition, a superior soundproofing property can be attained, as seen in the above-mentioned graph of FIG. 6.

Moreover, according to the second embodiment, as shown in FIG. 7, the instrument lower cover panel 41 may also be provided on the lower side of the instrument panel 40, so that a closed space is formed inside the instrument panel 40. Thus, the sound absorbing property inside the instrument panel 40 can be enhanced.

Figure 8:
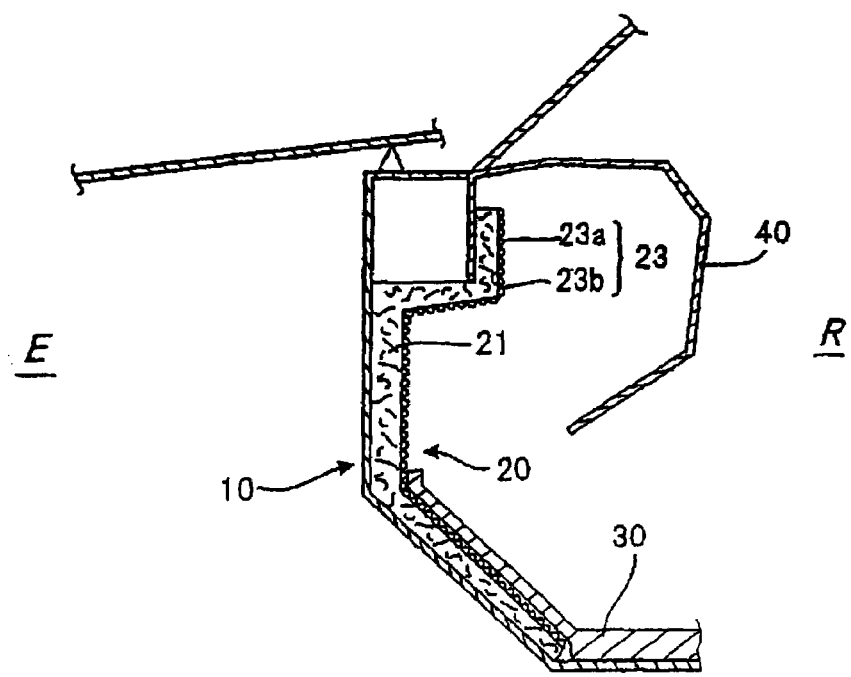
FIGS. 8 to 10 illustrate a third embodiment in which the present invention is applied to a vehicle insulator dash.
Figure 9:
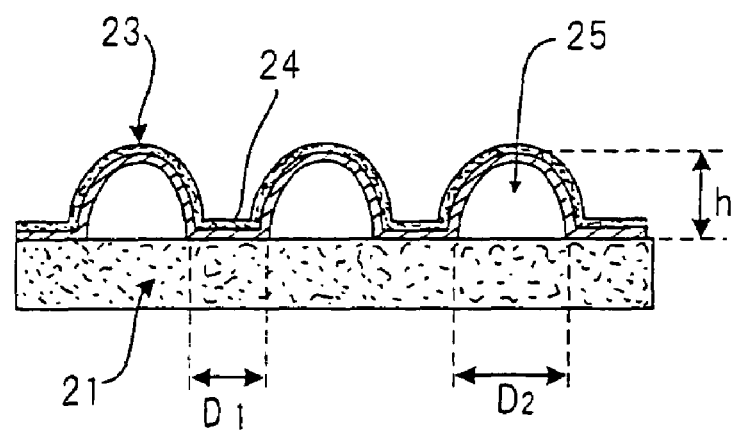
Figure 10:
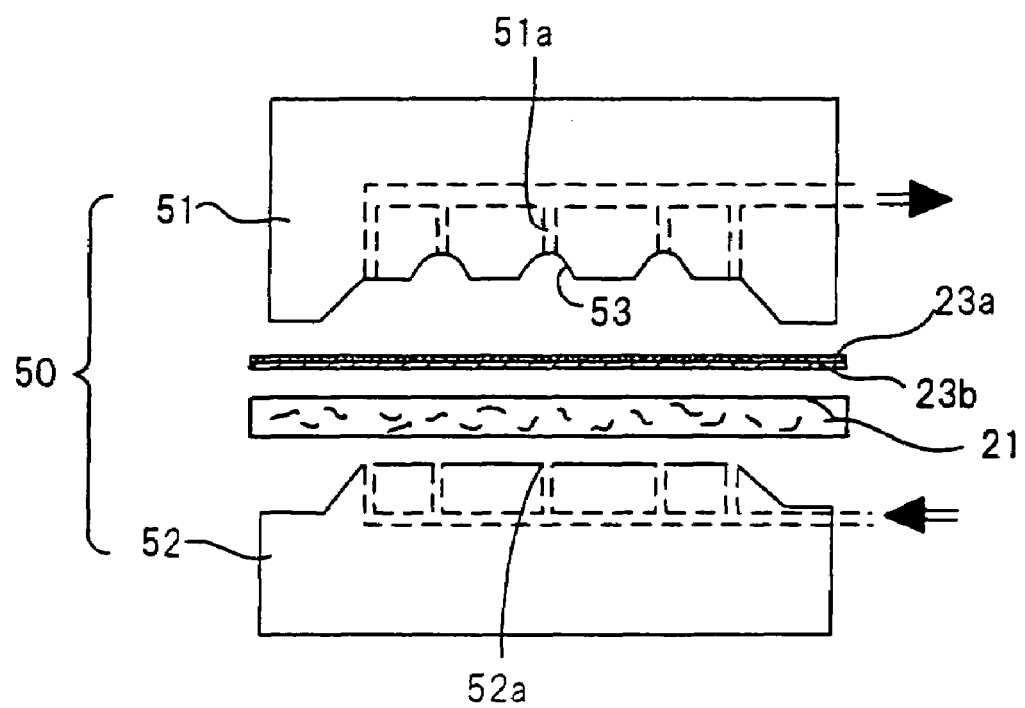

FIGS. 8 to 10 illustrate the third embodiment of the present invention. The same parts as those in the first and second embodiments are designated by the same reference numerals, and their detailed description is omitted.

As shown in FIG. 8, in the insulator dash 20 according to the third embodiment, as a surface skin layer 23 laminated to the surface side of the sound absorbing layer 21, a laminate in which a hot melt film 23b is laminated to the back side of a non-woven fabric 23a is used.

As the material of the non-woven fabric, polyester fiber is used. The weight per area thereof is set to be in the range of 10 to 100 g/m$^2$. The hot melt film 23b functions as a bonding medium, and a thickness of 10 to 100 μm is employed.

Moreover, referring to the relation between the sound absorbing layer 21 and the surface skin layer 23, the surface skin layer 23 is formed so as to have a concave-convex shape, as shown in FIG. 9. The concave portions of the surface skin layer 23 are used to be adhesion portions 24 between the sound absorbing layer 21 and the surface skin layer 23. The area D1 of the adhesion portions 24 is in the range of 0.5 to 100 cm$^2$.

The convex portions of the surface skin layer 23 correspond to air layers 25. The area D2 of the air layers is in the range of 1 to 100 cm$^2$. The height h of the air layers 25 is in the range of 1 to 10 mm.

As shown in FIG. 9, the product surface is formed into a concave and convex shape, and the air layers corresponding to the convex portions are formed between the sound absorbing layer 21 and the surface skin layer 23. The surface skin layer 23 is resistant to breaking, due to the shock absorbing action of the air layers 25. Thus, the efficiency for installing the insulator dash 20 on the body panel is increased. Moreover, warp which may be caused by the difference between the shrink ratios of the sound absorbing layer 21 and the surface skin layer 23 can be suppressed, and the fitness to the body panel is enhanced. The product surface has a concave and convex shape, which is effective in concealing wrinkle or the like. Thus, the appearance can be improved and since the surface area of the surface skin layer 23 is increased, the sound absorption performance for noise from the cabin side is enhanced.

Hereinafter, a method for forming the insulator dash 20 shown in FIGS. 8 and 9 will be described with reference to FIG. 10. A mold 50 comprises an upper die 51 and a lower die 52. Numerous vacuum suction holes 51a are provided in the die surface of the upper die 51, and a vacuum suction mechanism, not shown, is provided. In addition, the die surface of the upper die 51 is provided with a concave and convex surface 53, which corresponds to the concave and convex portions of the product. On the other hand, numerous blow holes 52a are provided in the die surface of the lower die 52, and an air blowing mechanism, not shown, is provided.

While the mold 50 is in the open state, the surface skin layer 23 is heated and softened with an infrared ray heating device, and the sound absorbing layer 21 is heated and softened by a hot blow heating device, and thereafter, they are placed into the mold 50. Then, the upper and lower dies 51 and 52 are clamped together. Simultaneously, the surface skin layer 23 is sucked under vacuum through the upper die 51, while air is supplied to the sound absorbing layer 21 through the lower die 52. Thereby, the insulator dash 20 is formed in which the surface skin layer 23 is raised from the sound absorbing layer 21 so as to form the air layers 25.

Figure 11:
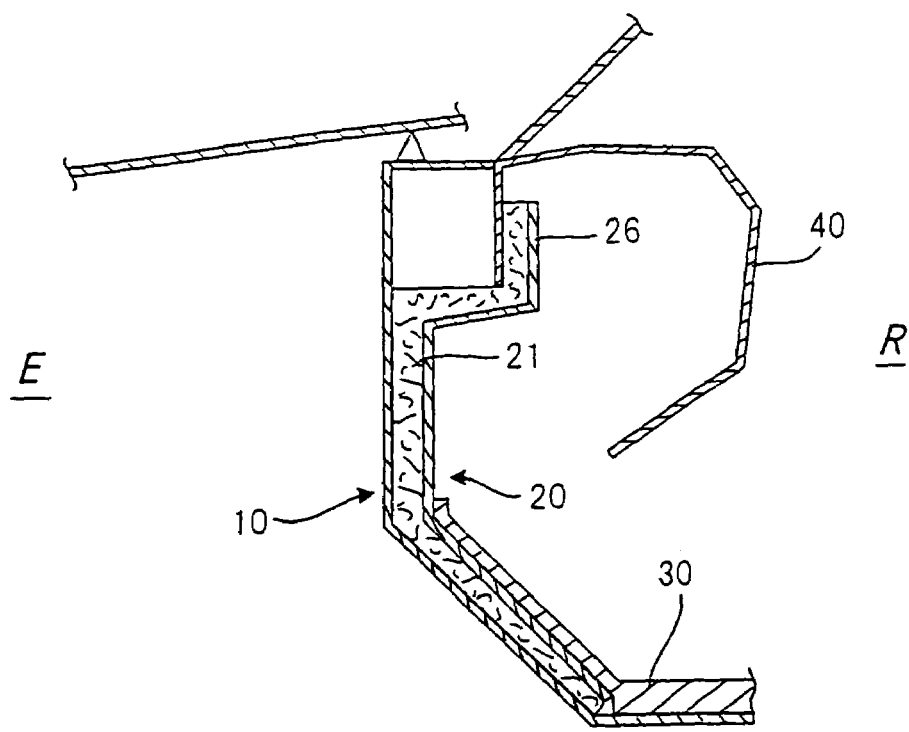
FIGS. 11 to 15 illustrate a fourth embodiment in which the present invention is applied to a vehicle insulator dash.

FIGS. 11 to 15 show a fourth embodiment of the present invention. In the insulator dash 20 according to this embodiment, a film layer 26 is integrally laminated to the front surface side of the sound absorbing layer 21, as shown in FIG. 11.

Accordingly, in this embodiment, the conventional sound shielding layer made of a rubber sheet having a large weight, a polyvinylchloride sheet, or the like is abolished. Thereby, the weight can be reduced, and the efficiency for installing operation is increased. Similarly to the above-described embodiment, the transmission noise transmitted through the sound absorbing layer 21 and the film layer 26 to the inside of the instrument panel 40 is reflected from the inner surface of the instrument panel 40 and enters the film layer 26 and the sound absorbing layer 21 again. At this time, the reflected noise is absorbed according to the film vibration-sound absorption function of the film layer 26. Thus, in this embodiment, a rise of sound pressure in the instrumental panel 40 and the echo of noise may be prevented, thereby increasing a silentness in a cabin. Regarding the structure, since the film layer 26 is integrally laminated to the sound absorbing layer 21, the insulator dash 20 has a simple structure and can be easily produced.

Figure 12:
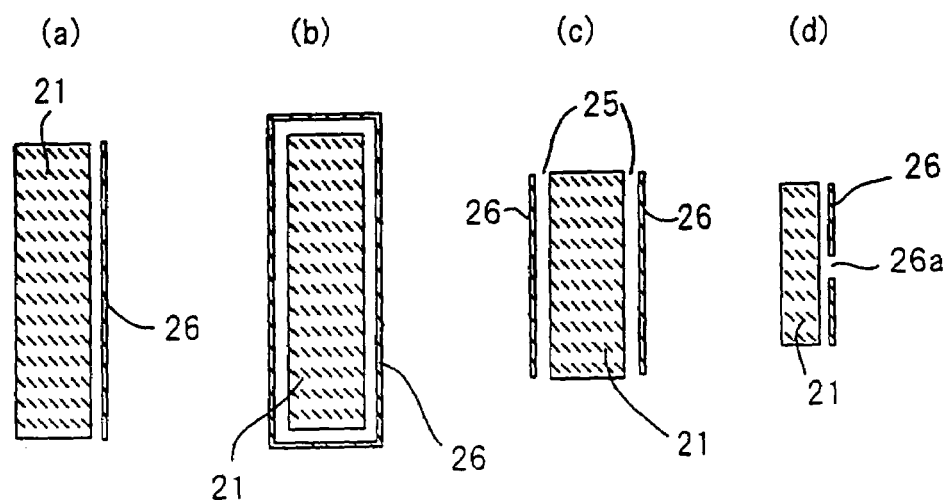

Referring to the integration of the film layer 26 with the sound absorbing layer 21, variations shown in FIG. 12 can be suggested, depending on the sound vibration characteristics of the motor vehicle and the sound absorbing properties of the sound absorbing layers 21.

In FIG. 12(a), the film layer 26 is integrally laminated to the front surface side of the sound absorbing layer 21. In FIG. 12(b), the whole periphery of the sound absorbing layer 21 is surrounded by the film layer 26. In FIG. 12(c), the film layer 26 is arranged on both the front surface side and the back side of the sound absorbing layer 21, with an air layer 25 being partially interposed between them. In FIG. 12(d), the film layer 26 is laminated to one front surface side of the sound absorbing layer 21, with a part of the film layer 26 being provided with an opening 26a. Thus, the sound absorbing layer 21 is partially covered with the film layer 26.

The process for integrally laminating the film layer 26 with the sound absorbing layer 21 will be described. In the case in which the sound absorbing layer 21 used in the first embodiment and the second embodiment is employed, the raw mat for the sound absorbing layer 21 may be coated with hot-melt-type powder, and heat-treated to be softened. Then, the film layer 26 is made to overlap the mat and is integrally laminated to the mat.

As the material of the film layer 26, polyolefin-type resin films, polyurethane-type resin films, polyester-type resin-films, paper or the like, or composite materials thereof may be used. A thickness of the film layer 26 of 10 to 200 μm is adopted. The film layer 26 is effective in preventing fibrous dust of the sound absorbing layer 21 from being externally released therefrom.

Figure 13:
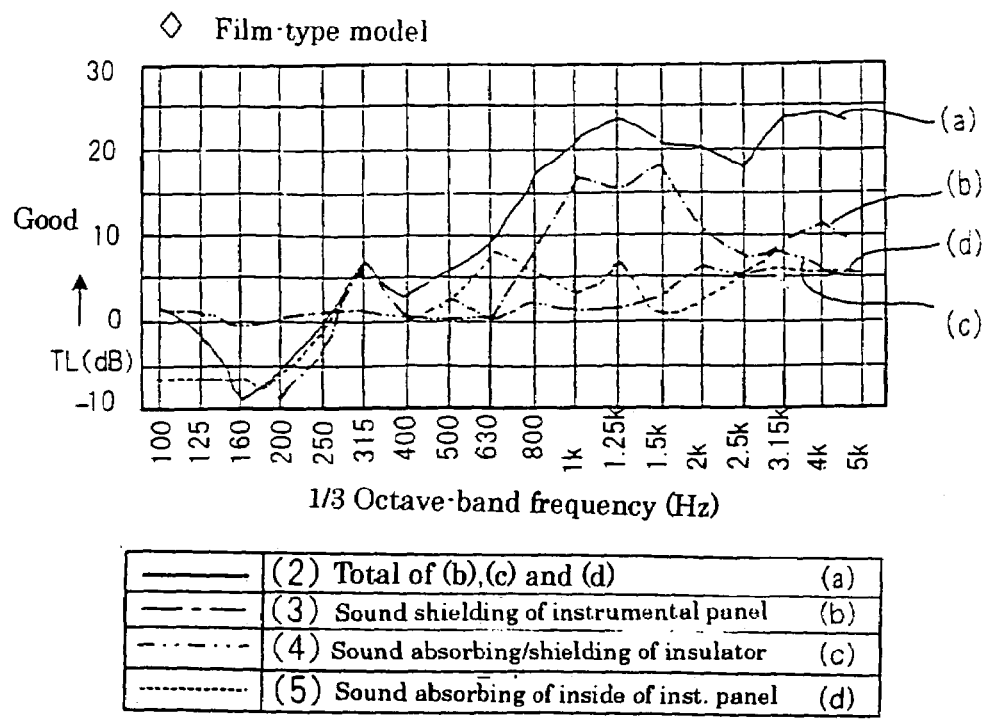

FIG. 13 is a graph showing the soundproofing property of the insulator dash 20 according to the fourth embodiment.

Also, in the fourth embodiment, the total soundproofing property (a) of the insulator dash 20 is equivalent to the sound shielding property (b) of the instrument panel 40, the sound absorbing and shielding property (c) of the insulator dash 20, and the sound absorbing property (d) the inside of the instrument panel 40. As seen in the graph of FIG. 13, a superior sound absorbing property in the range of 630 to 4000 Hz can be expected.

Figure 14:
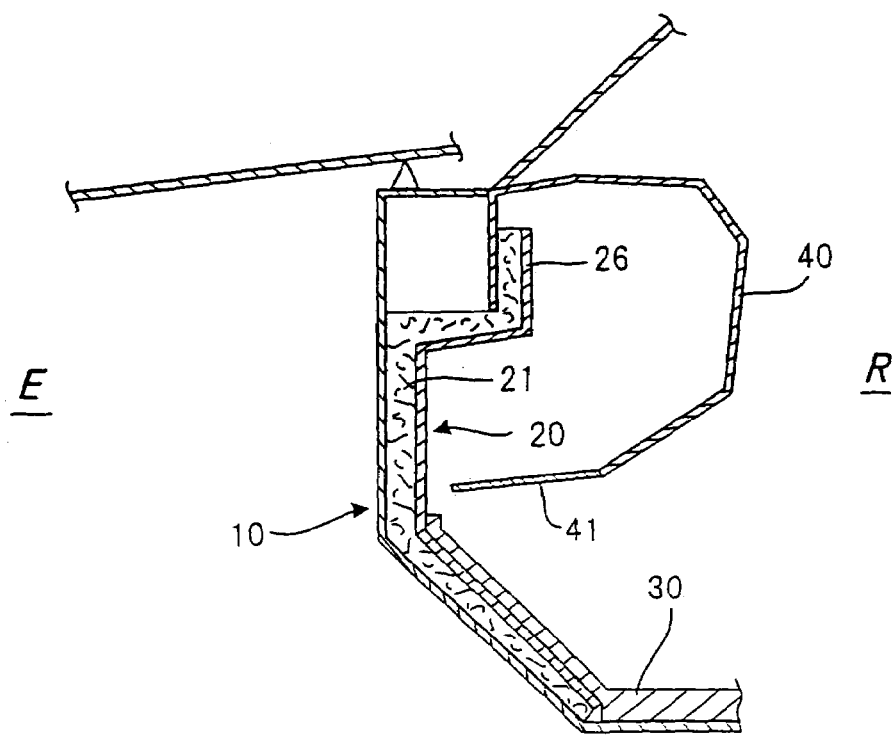

Moreover, in the fourth embodiment, as shown in FIG. 14, the instrument lower cover panel 41 may be provided on the lower side of the instrument panel 40. Thus, the inside of the instrument panel 40 forms a closed space, which enhances the sound absorbing property of the instrument panel 40.

Figure 15:
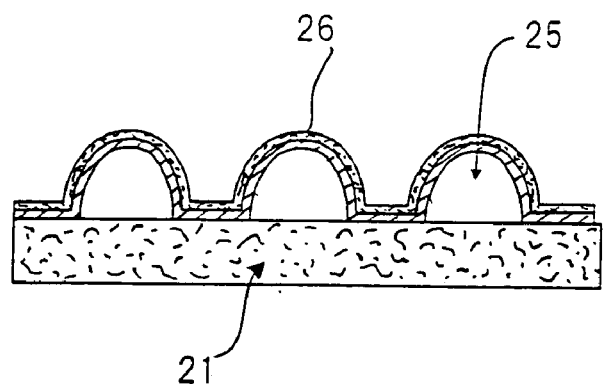

As shown in FIG. 15, the film layer 26 may be partially raised from the sound absorbing layer 21 so as to form the air layers 25. In this case, a material in which a hot melt film, functioning as an adhesion layer, is laminated to the back side of a nylon (polyamide) resin film is suitable for the film layer 26, in view of the heat resistance and forming properties thereof.

In this case, regarding the method for forming, a mold 50 shown in FIG. 10 may be used. The structure of the adhesion portions 24 and the air layers 25 are the same as those of the surface skin layer 23 according to the third embodiment.

Figure 16:
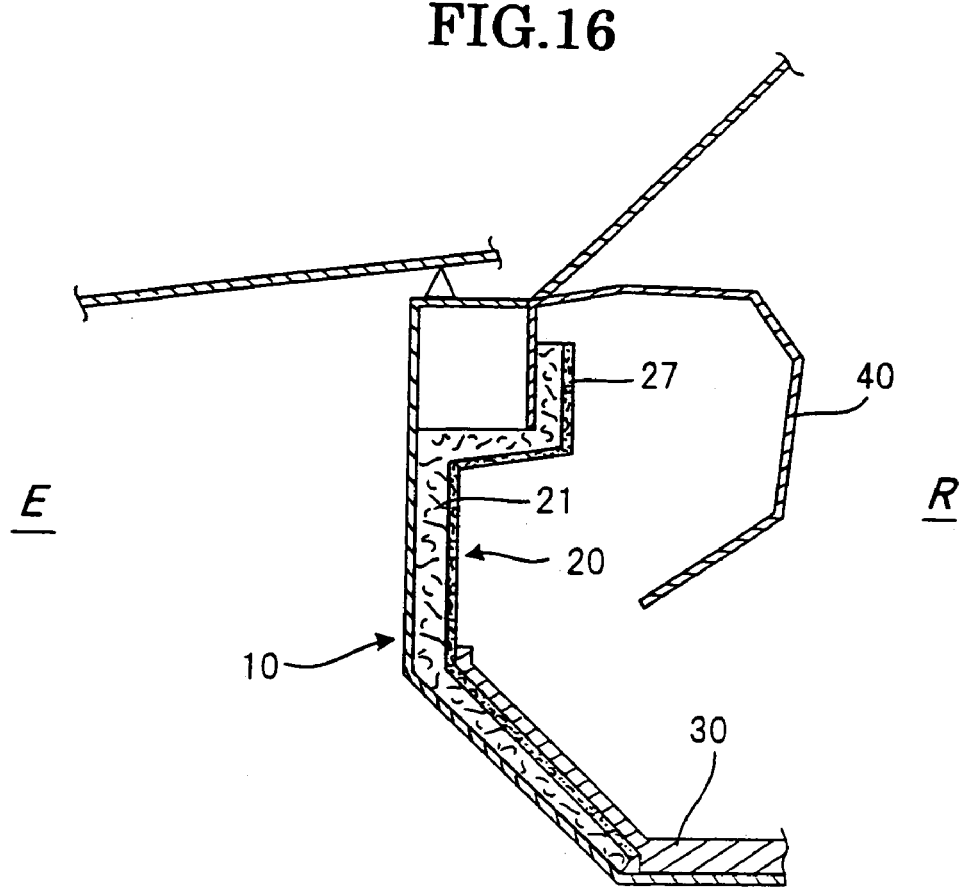
FIGS. 16 to 19 illustrates a fifth embodiment in which the present invention is applied to a vehicle insulator dash.

Hereinafter, a fifth embodiment of the present invention will be described with reference to FIGS. 16 to 19. In FIG. 16, the insulator dash 20 installed at the interior side surface of the dash panel 10, which separates the engine room E and the cabin R from each other, essentially comprises the sound absorbing layer 21 formed into a required shape in conformation with the surface features of the dash panel 10, and a surface skin layer 27 made of a material which is lightweight and soft.

In particular, the sound absorbing layer 21 is required to have a desired porous sound-absorbing function. Thus, for example, the sound absorbing layer 21 is formed of a fiber assembly of felt, a polyester fiber, e.g., PET (polyethylene-terephthalate), or paper (pulp etc.) and so on in the form of fibers. In this embodiment, fibers having heat-melt bonding properties, as a binder, are mixed with polyester fibers as a base, thereby a fiber mat is formed. The mat is heated and softened with a hot blow heating device, and is then formed by cold-pressing. The sound absorbing layer 21 whose thickness is desirably changed, i.e., it contains thick portions and thin-portions and has a desired shape and size, is thus formed. The planar density of the sound absorbing layer 21 is adjusted to be in the range of 0.03 to 3.0 kg/m$^2$.

On the other hand, porous materials (foam material) of polyolefin-type resin, EPDM (ethylene-propylene-diene methylene linkage), or the like instead of a conventional sound shielding layer having a large weight and a high density, is used for the surface skin layer 27. As material of the surface skin layer, synthetic resins such as polypropylene, polyurethane, polyester, and the like may be used.

The planar density of the surface skin layer 27 is not particularly limited, and is preferably in the range of, for example, 0.005 to 0.3 kg/m$^2$. The thickness is in the range of 1 to 15 mm. The surface skin layer 27 is bonded to the whole or a part of the surface of the sound absorbing layer 21.

The floor carpet 30 is laid on the lower surface side of the insulator dash 20 in a lapping manner. Furthermore, the instrument panel 40 is arranged on the upper side of the insulator dash 20.

Accordingly, in the insulator dash 20 according to the fifth embodiment, the surface skin layer 27 containing a foam material with a small weight is employed as a base, instead of a conventional sound shielding layer with a large weight. Thus, advantageously, the weight of the insulator dash 20 can be reduced, and the efficiency of the fuel consumption of the vehicle can be increased. In addition, the installing operation in which the insulator dash 20 is fixed to the dash panel 10 can be carried out without trouble. Thus, the installing workability is enhanced.

In addition, the sound absorbing property can be enhanced, due to the variations of the surface skin layer 27 using a foam material. In particular, in the case where a foam material of the closed-cell-type and being gas impermeable is used for the surface skin layer 27, the energy of a part of the transmission noise transmitted through the dash panel 10 into the cabin R is attenuated by the sound absorbing layer 21. Moreover, since the surface skin layer 27 has a gas-impermeable foam structure, the surface skin layer 27 can effectively absorb noise due to the film vibration, especially in the low and middle frequency ranges (500 to 2500 Hz).

On the other hand, by using an open cell type foam material as the surface skin layer 27 and controlling the air permeability, noise in the intermediate and high frequency range (800 to 4000 Hz) can be effectively absorbed, in addition to the absorption function in the low and intermediate frequency ranges (500 to 2500 Hz) as a result of the film vibration of the gas impermeable foam material.

Accordingly, the tuning operation of the frequency range to noise to be absorbed can be easily performed by controlling the air permeability of the surface skin layer 27 using the foam material.

Moreover, in the case in which the surface skin layer 27 containing a foam material as a base is used, noise transmitted through the insulator dash 20 propagates inside the cabin and is reflected in the instrument panel 40. Thereafter, the reflected noise is transmitted through the surface skin layer 27 again, enters the vehicle insulator dash 20, and is absorbed. Therefore, the noise level in the cabin can be reduced. This contributes to enhancement of the sound absorbing performance in the cabin.

Figure 17:
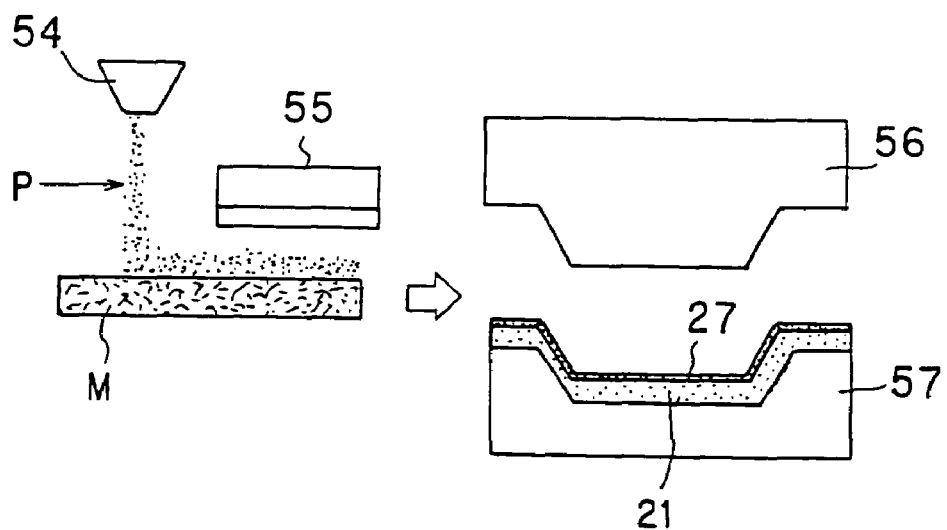

Hereinafter, the outline of a production process for the insulator dash 20 will be described with reference to FIG. 17. A raw mat M as a material for the sound absorbing layer 21 is heated and softened with a hot blow heating device or the like (not shown in the drawing), and thereafter, resin powder P is sprayed thereon by means of a powder spraying device 54.

According to this embodiment, a foamed resin material containing azodicarbonamide (foaming agent) mixed with polypropylene resin is used as the resin powder P. In this case, the resin powder P is sprayed so that the planar density thereof is in the range of 0.05 to 4.0 kg/m$^2$.

Thereafter, the resin powder P is heat-melted to be bonded. Then the raw mat M with the resin powder is set in a lower die 57 while a cold press mold (an upper die 56 and the lower die 57) is in the open state. Then, the upper die 56 is lowered to its lower dead point for cold press forming. Thus, the sound absorbing layer 21 can be formed into a desired shape and the surface skin layer 27 can be integrally laminated to the surface of the sound absorbing layer 21. Thus, the insulator dash 20 shown in FIG. 16 can be easily formed.

In this case, the thickness of the surface skin layer 27 is set to be in the range of 0.05 to 10 mm. The heating process with a heater 55 may be omitted. That is, the resin powder P may be heat-melted to be bonded by use of the residual heat of the raw mat M, and is formed into a desired shape and size by means of the dies 56 and 57 for cold press molding.

As described above, the surface skin layer 27 can be formed by heat-melt-bonding of the resin powder P. Accordingly, the variations of the surface skin layer 27 can be changed. Thus, the insulator dash 20 having such a superior soundproofing property satisfying a required sound shielding and absorbing performance can be provided.

Figure 18:
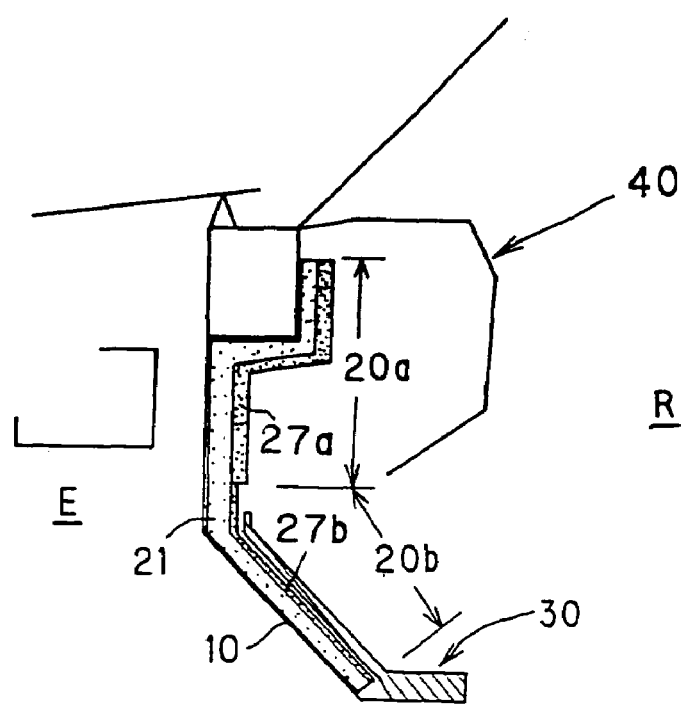
Figure 19:
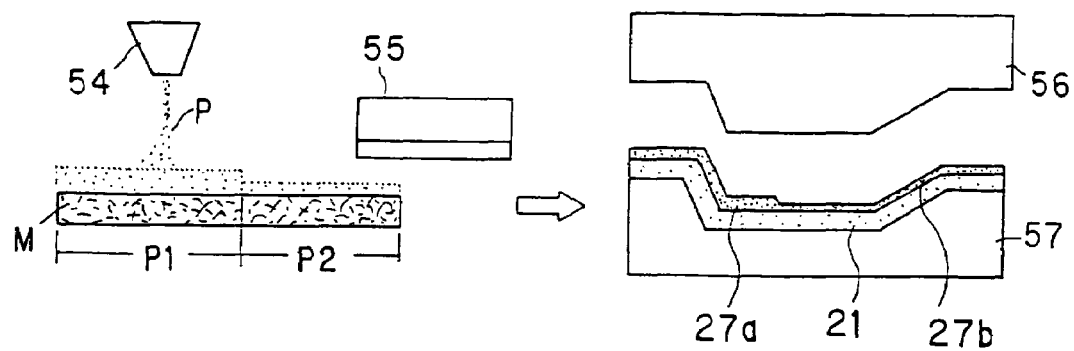

Further, FIGS. 18 and 19 show a modification of the fifth embodiment. FIG. 18 is a cross-sectional view showing the structure of the insulator dash 20. FIG. 19 is a schematic view showing a production process for the insulator dash 20.

The insulator dash 20 is divided into upper and lower portions for the sake of convenient of explanation. A surface skin layer 27a with a large planar density is laminated to the upper portion 20a, while a surface skin layer 27b with a relatively low planar density is laminated to the lower portion 20b.

In the modification, the surface skin layer 27a, having a large amount of sprayed resin powder P and being of the sound-shielding type, is formed so as to deal with noise in the lower frequency range which is transmitted through the upper portion of the dash panel 10 and propagates in the cabin. On the other hand, the surface skin layer 27b, having a small amount of sprayed resin powder P and being of the sound-absorbing type, is formed so as to deal with the noise in the higher frequency range is transmitted through the lower portion of the dash panel 10.

Referring to a process of manufacturing the above-described insulator dash 20 in which the resin powder P is sprayed by means of a powder spraying device 54, the resin powder P is sprayed onto the heat-softened raw mat M at different spraying amounts (in the drawing, P1 represents the portion where the spraying amount of the resin powder P is set to be large, and P2 represents the portion where the spraying amount of the resin power P is set to be small), as shown in FIG. 19.

Thereafter, the sprayed raw mat is heat-treated with the heater 55 and formed by means of the dies 56 and 57. Thus, as shown in FIG. 18, the insulator dash 20, having the surface skin layer 27 which has portions with different planar density, can be easily formed.

Hereinafter, a sixth embodiment of the present invention will be described with reference to FIGS. 20 to 23.

Figure 20:
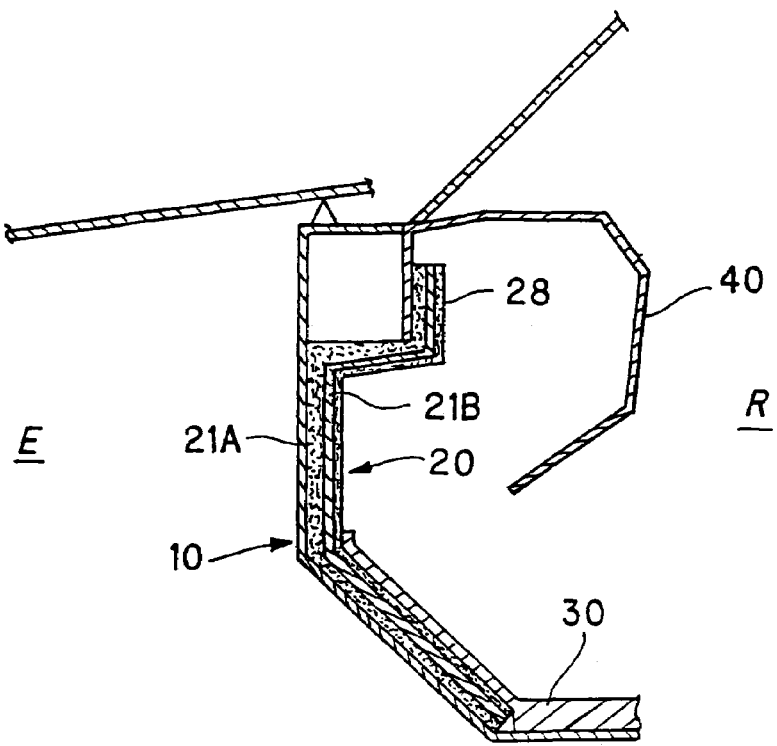
FIGS. 20 to 23 illustrate a sixth embodiment in which a sound insulator for vehicle of the present invention is applied to a vehicle insulator dash.

In FIG. 20, the insulator dash 20 to which the sixth embodiment of the present invention is applied comprises a surface skin layer 28, an auxiliary sound-absorbing layer 21B, and a base sound absorbing layer 21A, which are laminated in that order from the product surface side.

In detail, a lightweight material instead of a conventional sound-shielding layer having a large weight is used for the surface skin layer 28. For example, the surface skin layer 28 is made of material such as olefin, EPDM, and so forth. As the materials, foam materials or films made of polypropylene, polyurethane, polyethylene, polyester and the like may be used, or fiber assembly formed of felt, PET fibers, or paper (pulp or the like) in the form of fibers may be used.

The planar density of the surface skin layer 28 is not restricted to a particular numerical value. Preferably, the planar density is in the range of 0.005 to 0.3 kg/m$^2$. The thickness does not exceed 15 mm.

As shown in the drawing, the surface skin layer 28 may be formed on the whole front surface of the sound absorbing layer 21, or it may be formed on a part of the surface. Moreover, the surface skin layer 28 may be formed on both sides of the sound absorbing layer 21.

Referring to the materials for the sound absorbing layer 21, fiber assembly of felt, PET or paper (pulp etc.) or the like which are formed to be fibrous, porous materials (foam materials) of olefins, EPDM or the like may be used. Regarding the base sound-absorbing layer 21A, the planar density is set to be in the range of 0.2 to 3.0 kg/m$^2$ and the thickness is set to be in the range of 2 to 200 mm so as to obtain a porous sound-absorption function.

On the other hand, the auxiliary sound absorbing layer 21B provided for the base sound absorbing layer 21A has smaller planar density and spring constant than those of the sound absorbing layer 21A. Suitably, the planar density is up to 0.5 kg/m$^2$, and the thickness is in the range of 1 to 30 mm.

Figure 21:
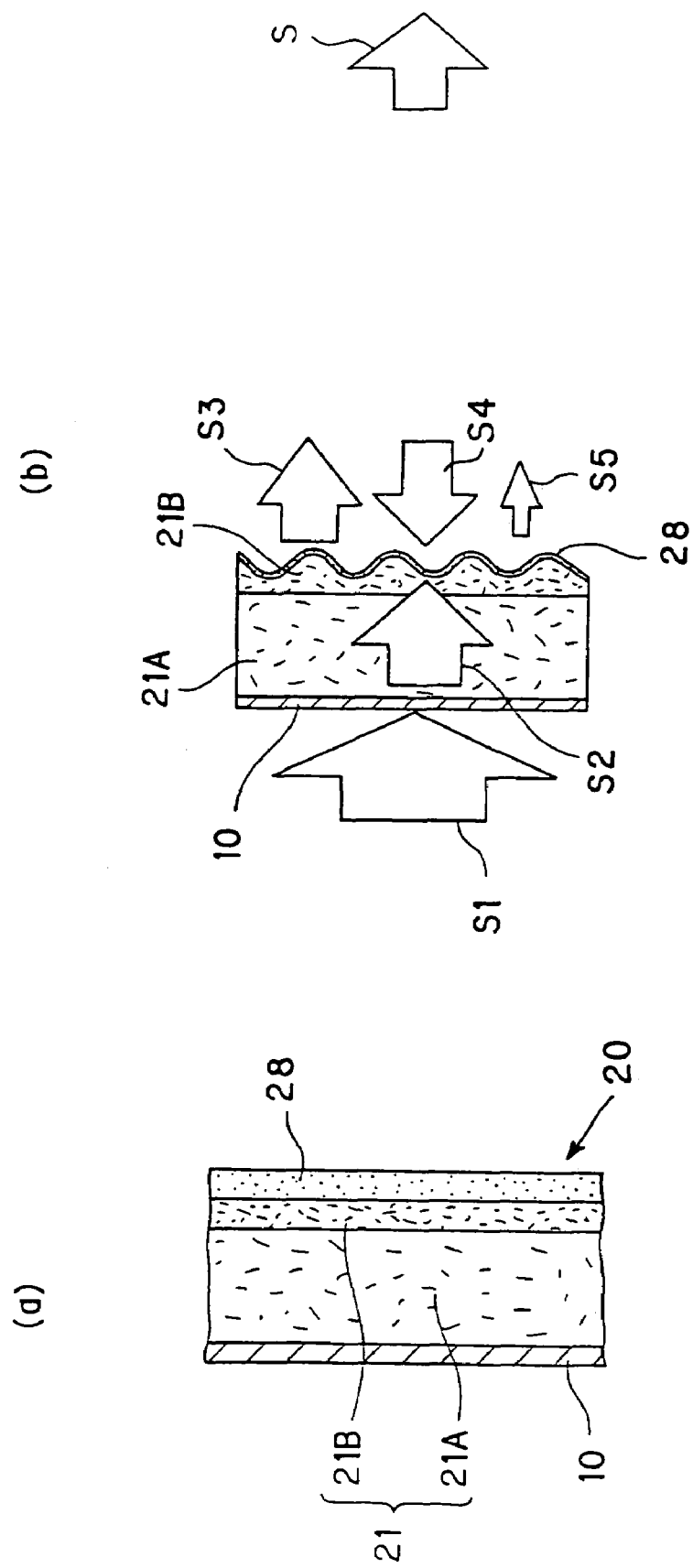

Moreover, regarding the insulator dash 20 shown in FIGS. 20 and 21, a light-weight material is used for the surface skin layer 28. Thus, the weight of the product can be reduced, and the efficiency of installing operation and the fuel consumption can be increased. In addition, the sound absorbing performance can be controlled by varying the air permeability of the surface skin layer 28.

In the case of the air impermeable state or a low permeability state, noise in the low and intermediate frequency ranges (500 to 2500 Hz) can be effectively absorbed due to the film vibration or resonance property of the surface skin layer 28. Furthermore, by increasing the air permeability of the surface skin layer 28, a porous sound absorbing function can be obtained, so that noise in the intermediate and high frequency ranges (800 to 4000 Hz) can be effectively absorbed. That is, the frequency range can be tuned to the noise to be absorbed. Thus, the sound absorbing property can be appropriately changed according to the target frequencies depending on the vehicle.

Moreover, the sound absorbing layer 21 may be formed to have a two-layer structure in which an auxiliary sound absorbing layer 21B having a low planar density and a small spring constant is provided between the base sound absorbing layer 21A and the surface skin layer 28. Thereby, the film sound absorption function or the resonance sound absorption function of the surface skin layer 28 is effectively achieved. Thus, the sound absorption performance of the surface skin layer 28 can be increased.

Hereinafter, the soundproofing mechanism of the insulator dash 20 according to a sixth embodiment will be described with reference to FIG. 21(b). Incident sound S1 from the dash panel 10 is attenuated by the base sound absorbing layer 21A to become a sound-absorbing-material internal sound S2, which is transmitted through the auxiliary sound absorbing layer 21B and the surface skin layer 28 and propagates inside the cabin as a transmission sound S3.

Moreover, a radiation sound S4 from the inside of the cabin is transmitted through the surface skin layer 28 and is absorbed in the sound absorbing layers 21A and 21B again. As a result, the reflection sound S5 becomes very small. Accordingly, the cabin-side sound S is expressed by S=S3+S5. The auxiliary sound absorbing layer 21B made of a soft material is interposed between the base sound absorbing layer 21a and the surface skin layer 28, so that the vibration of the surface skin layer 28 is attenuated, and the transmission of vibration from the base sound absorbing layer 21A to the surface skin layer 28 is decreased. As a result, the reflection sound S5 can be controlled to be small, and reflection sounds in the low and intermediate frequency ranges can be decreased.

Figure 22:
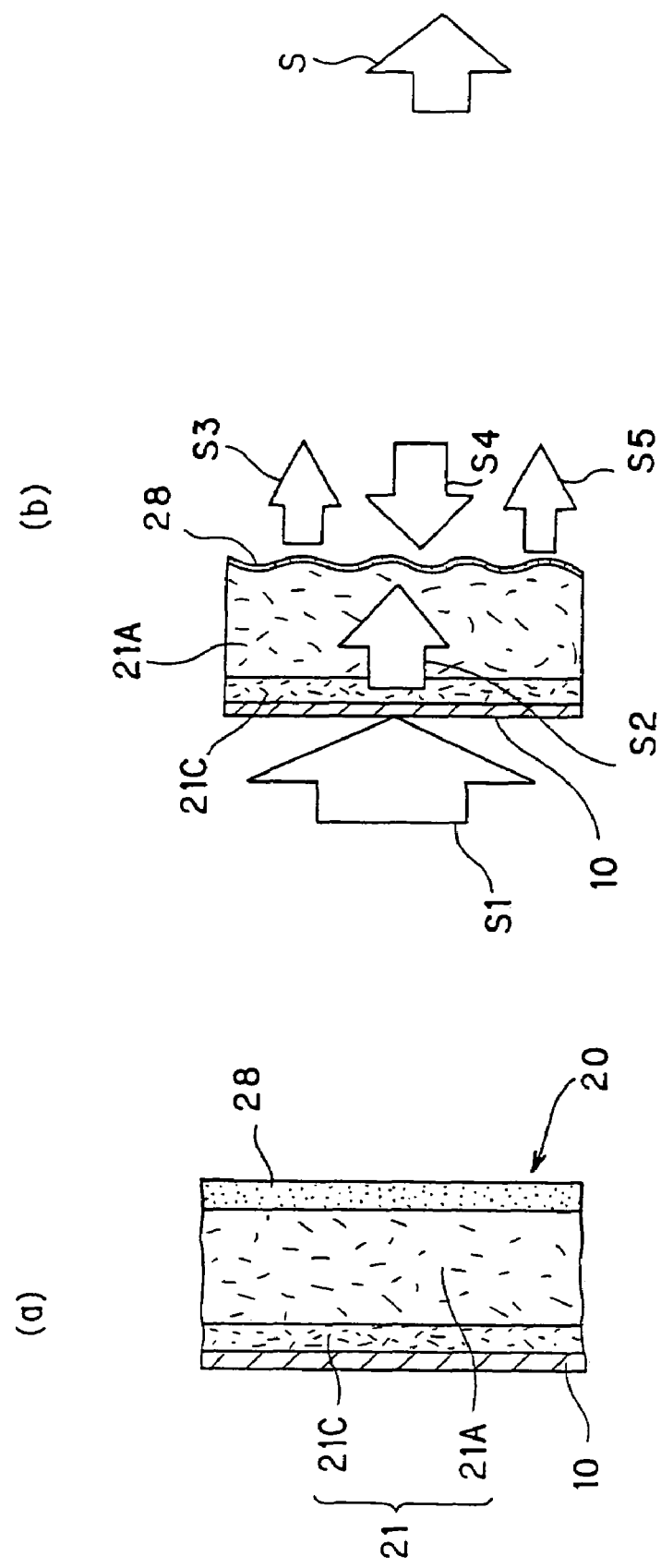

FIG. 22 shows a modification of a sixth embodiment of the present invention. The insulator dash 20 of this modification comprises the surface skin layer 28 and the two sound absorbing layers 21A and 21C. In the structure, the auxiliary sound absorbing layer 21C having a small planar density and a low spring constant is interposed between the base sound absorbing layer 21A, having a porous sound absorption function, and the dash panel 10.

Accordingly, of the noise transmitted through the dash panel 10, vibrations especially in the low frequency range can be reduced by the auxiliary sound absorbing layer 21C. Thus, the sound absorbing performance for noise in the low frequency range can be enhanced.

Hereinafter, the soundproofing mechanism of the insulator dash 20 will be described with reference to FIG. 22(b). That is, the incident sound S1 from the dash panel 10 is attenuated by the auxiliary sound absorbing layer 21C and the base sound absorbing layer 21A to become a sound-absorbing-material internal sound S2, which is transmitted through the surface skin layer 28 and propagates inside the cabin as a transmission sound S3.

In this case, the transmission of vibration to the dash panel 10 and the base sound absorbing layer 21A can be reduced. Thus, the sound-absorbing-material internal sound S2 can be controlled to be small. The radiation sound S4 from the inside of the cabin is transmitted through the surface skin layer 28 and is absorbed by the base sound absorbing layer 21A. A part of the sound is reflected toward the cabin side as a reflection sound S5.

Thus, the cabin-side sound S is expressed by S=S3+S5. Since the sound-absorbing-material internal sound S2 can be suppressed, the transmission sound S3 can be reduced, and especially, vibrations in a low frequency range can be effectively attenuated.

Figure 23:
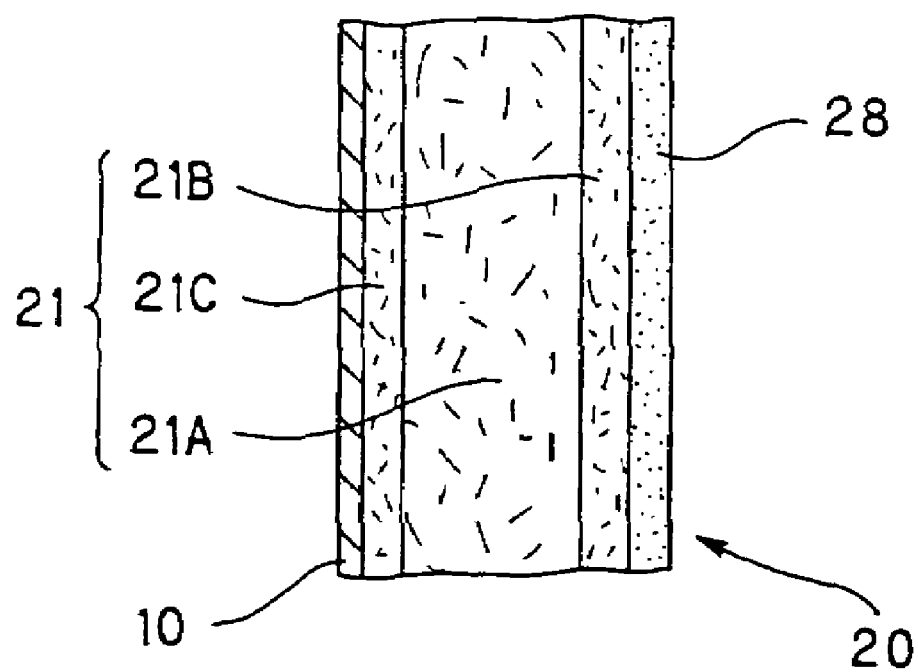
Figure 24:
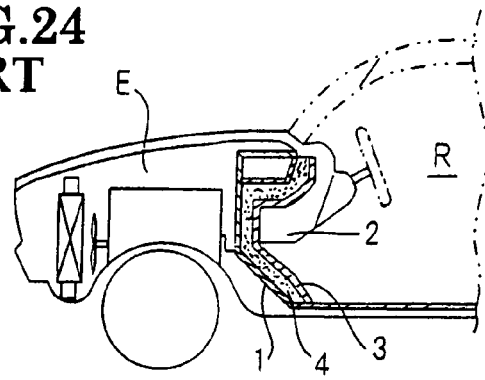
FIGS. 24–26 illustrate a conventional soundproofing mechanism having a two-layer structure.
Figure 25:
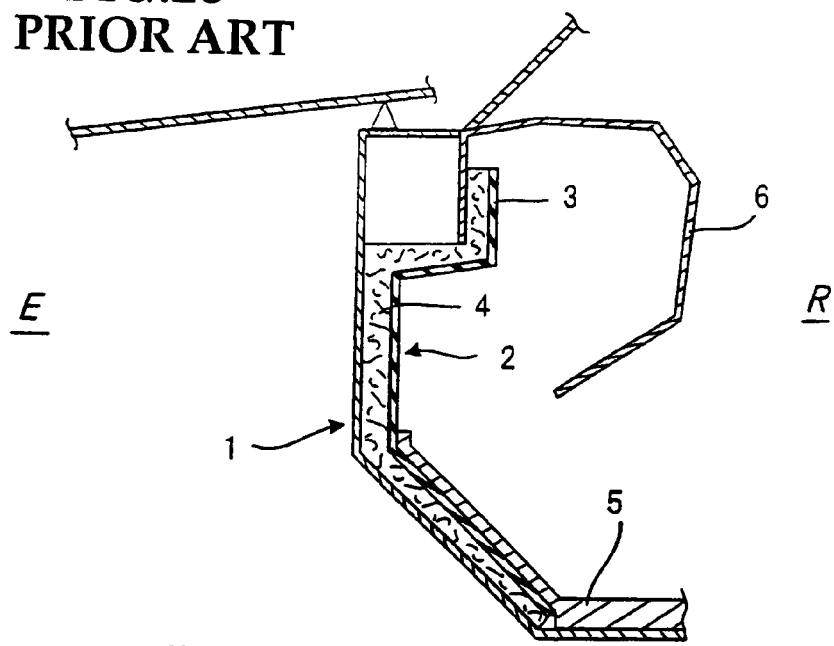
Figure 26:
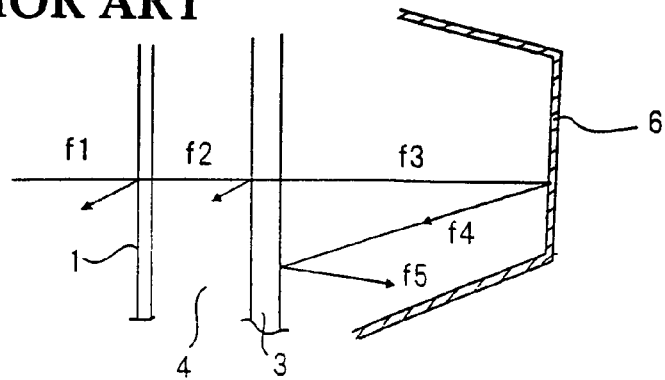

Then, the insulator dash 20 shown in FIG. 23 has a three-layer structure using the sound absorbing layers 21A, 21B, and 21C. The two auxiliary sound absorbing layers 21B and 21C are laminated onto both the sides of the sound absorbing base layer 21A. The auxiliary sound absorbing layers 21B and 21C have a lower planar density, a smaller spring constant, and a smaller thickness compared to those of the base sound absorbing layer 21A.

Thus, in the insulator dash 20, the auxiliary sound absorbing layer 21B having a lower planar density and a smaller spring constant is laminated to the side of the base sound absorbing layer 21A adjacent to the surface skin layer 28, so that better sound absorbing performance of the surface skin layer 28 can be obtained. In addition, the auxiliary sound absorbing layer 21C having a low planar density and a small spring constant is interposed between the dash panel 10 and the side of the base sound absorbing layer 21A adjacent to the dash panel 10, so that vibrations, especially in the low frequency range, from the dash panel 10 can be suppressed. Thus, both the transmission sound S3 and the reflection sound S5 can be reduced, and thereby, the sound absorption performance can be further enhanced.

In the above-described embodiments, the insulator dash 20 installed at the interior side surface of the dash panel 10 is described. The embodiments can be applied to general insulators which are installed on body panels.

INDUSTRIAL APPLICABILITY

As described above, the sound insulator for vehicle and a method for manufacturing the same according to the present invention are suitable for a vehicle insulator dash installed at the interior side surface of a dash panel and positioned in the internal space of an instrument panel and its production method. The sound insulator and its manufacturing method can be applied to general insulators which are installed at the interior side surface of a body panel, on the engine-room-side of the body panel, and in the trunk. Also those lead the weight of the insulator dash to be reduced and the efficiency for installing operation to be enhanced. Further, a superior sound absorbing performance can be obtained. The sound insulator and its manufacturing method make a significant contribution to the silentness in a cabin.

The invention claimed is:

1. A gas-permeable sound insulator for a vehicle which is installed at the interior side surface of a body panel, comprising a single sound absorbing layer composed of a fibrous molding assembly;
    wherein said gas-permeable sound insulator is formed without a sound shielding layer, and said gas permeable sound insulator absorbs transmission noise, said transmission noise being transmitted through the body panel into the sound absorbing layer, and reflected noise, said reflected noise being reflected from an inner surface of an instrument panel and returned to said sound absorbing layer.

2. A sound insulator for a vehicle according to claim 1, wherein a surface skin layer formed of a high density fiber assembly having a higher density than the planar density of the sound absorbing layer is laminated to at least one of the front and back sides of the sound absorbing layer.

3. A sound insulator for a vehicle according to claim 1, wherein a surface skin layer comprising a hot melt film laminated to the back side of a non-woven fabric is laminated to the surface of the sound absorbing layer, said surface skin layer being formed to have a convex and concave shape, whereby the concave portions of the surface skin layer are bonded to the sound absorbing layer, and the convex portions of the surface skin layer form air layers.

4. A sound insulator for a vehicle according to claim 1, wherein a film layer is bonded to the sound absorbing layer.

5. A sound insulator for a vehicle according to claim 4, wherein the film layer is provided so as to cover the sound absorbing layer around the entire periphery of the sound absorbing layer.

6. A sound insulator for a vehicle according to claim 4, wherein the film layer is laminated onto the front and back surface sides of the sound absorbing layer.

7. A sound insulator for a vehicle according to claim 4, wherein the film layer is laminated onto the front surface side of the sound absorbing layer.

8. A sound insulator for a vehicle according to claim 4, wherein the film layer is provided on a part of the front and back surface sides of the sound absorbing layer.

9. A sound insulator for a vehicle according to any one of claims 4 to 8, wherein an air layer is provided between the film layer and the sound absorbing layer.

10. A sound insulator for a vehicle according to claim 9, wherein the film layer is formed to have a convex and concave shape, whereby the concave portions of the film layer are bonded to the sound absorbing layer, and the air layers are formed by the convex portions of the film layer.

11. A sound insulator for a vehicle according to claim 1, wherein a skin layer made of a foamed resin material is laminated to the whole or a part of at least one of the front and back surface sides of the sound absorbing layer.

12. A sound insulator for a vehicle according to claim 11, wherein the foamed resin material forming the surface skin layer has a gas-permeable structure, whereby the surface skin layer has a sound absorption function in the intermediate and high frequency ranges, in addition to the sound absorption function in the low and intermediate frequency ranges which is performed by the film vibration of the surface skin layer so that tuning of the frequency range of noise to be absorbed can be performed.

13. A sound insulator for a vehicle which is installed at the interior side surface of a body panel, comprising:
    a surface skin layer formed of a foam material, a film material, or a fiber assembly; and
    a plurality of sound absorbing layers formed of a foam material or a fiber assembly, said plurality of sound absorbing layers having different planar densities, spring constants, and thicknesses, wherein said sound insulator is gas-permeable,
    wherein the plurality of sound absorbing layers comprise a base sound absorbing layer, and an auxiliary sound absorbing layer positioned between the base sound absorbing layer and the body panel, said auxiliary sound absorbing layer having a lower planar density, a smaller spring constant, and a smaller thickness than those of the base sound absorbing layer.

14. A sound insulator for a vehicle which is installed at the interior side surface of a body panel, comprising:
    a surface skin layer formed of a foam material, a film material, or a fiber assembly; and
    a plurality of sound absorbing layers formed of a foam material or a fiber assembly, said plurality of sound absorbing layers having different planar densities, spring constants, and thicknesses, wherein said sound insulator is gas-permeable,
    wherein the plurality of sound absorbing layers comprise a base sound absorbing layer, and an auxiliary sound absorbing layer positioned between the base sound absorbing layer and the surface skin layer, said auxiliary sound absorbing layer having a lower planar density, a smaller spring constant, and a smaller thickness than those of the base sound absorbing layer.

15. A sound insulator for a vehicle according to claim 14, wherein the auxiliary sound absorbing layer is positioned between the base sound absorbing layer and the body panel.

16. A sound insulator for a vehicle according to claim 1, wherein a lower cover panel is provided on the lower side of the panel in a cabin, whereby the sound pressure of transmission noise transmitted through the sound absorbing layer from the body panel is reduced in the closed space of the panel.

* * * * *